United States Patent
Inose et al.

(10) Patent No.: US 9,797,495 B2
(45) Date of Patent: Oct. 24, 2017

(54) CLUTCH AND DIFFERENTIAL DEVICE WITH SAME

(71) Applicant: GKN Driveline Japan Ltd., Tochigi, Tochigi (JP)

(72) Inventors: Hideyuki Inose, Tochigi (JP); Yasuo Yamanaka, Tochigi (JP); Atsushi Maruyama, Tochigi (JP)

(73) Assignee: GKN Driveline Japan Ltd., Tochigi, Tochigi (JP)

( * ) Notice: Subject to any disclaimer, the term of this patent is extended or adjusted under 35 U.S.C. 154(b) by 0 days.

(21) Appl. No.: 15/227,224

(22) Filed: Aug. 3, 2016

(65) Prior Publication Data

US 2016/0341294 A1 Nov. 24, 2016

Related U.S. Application Data

(63) Continuation of application No. PCT/JP2014/053454, filed on Feb. 14, 2014.

(51) Int. Cl.
*F16H 48/24* (2006.01)
*F16D 11/00* (2006.01)
(Continued)

(52) U.S. Cl.
CPC ............. *F16H 48/24* (2013.01); *F16D 11/00* (2013.01); *F16D 11/14* (2013.01); *F16D 27/108* (2013.01);
(Continued)

(58) Field of Classification Search
None
See application file for complete search history.

(56) References Cited

U.S. PATENT DOCUMENTS 2,778,246 A * 1/1957 Thornton ............... F16H 48/08
464/38
6,095,303 A 8/2000 Gutmann et al.
(Continued)

FOREIGN PATENT DOCUMENTS

JP S58-56244 U1 4/1983
JP S64-83931 A 3/1989
(Continued)

OTHER PUBLICATIONS

International Search Report and Written Opinion for PCT/JP2014/053454 dated May 27, 2014 (9 pages).

*Primary Examiner* — Justin Holmes
(74) *Attorney, Agent, or Firm* — Bejin Bieneman PLC

(57) ABSTRACT

A clutch to be combined with a rotary machine rotating about an axis is comprised of a rotary member including a first face perpendicular to the axis, a first bottom receding in an axial direction from the first face, and plural first clutch teeth being arranged in a circumferential direction and respectively projecting from both the first face and the first bottom; and a clutch member movable in the axial direction relative to the rotary member, the clutch member including a second bottom, plural second clutch teeth being arranged in a circumferential direction and respectively projecting from the second bottom to be respectively engageable with the plural first clutch teeth, and an internal peripheral wall connecting internal ends of the plural second clutch teeth and projecting in the axial direction toward the rotary member.

5 Claims, 6 Drawing Sheets

(51) Int. Cl.
*F16D 27/118* (2006.01)
*F16H 48/34* (2012.01)
*F16D 11/14* (2006.01)
*F16D 27/108* (2006.01)

(52) U.S. Cl.
CPC ........... *F16D 27/118* (2013.01); *F16H 48/34* (2013.01); *F16D 2011/008* (2013.01)

(56) References Cited

U.S. PATENT DOCUMENTS

| | | | | |
|---|---|---|---|---|
| 7,988,584 | B2* | 8/2011 | Balenda, II | F16H 48/30 475/236 |
| 2001/0044355 | A1* | 11/2001 | Cheadle | F16H 48/22 475/150 |
| 2002/0155913 | A1* | 10/2002 | Fusegi | B60K 23/04 475/150 |
| 2007/0054771 | A1 | 3/2007 | Fusegi | |
| 2007/0197338 | A1* | 8/2007 | Fusegi | F16H 48/08 475/231 |
| 2010/0140042 | A1* | 6/2010 | Elliott | F16D 11/14 192/69.7 |
| 2012/0264559 | A1* | 10/2012 | Mayr | F16H 48/24 475/220 |
| 2013/0237363 | A1* | 9/2013 | Fusegi | F16H 48/24 475/230 |
| 2014/0110211 | A1* | 4/2014 | Andonian | F16D 11/14 192/69.8 |

FOREIGN PATENT DOCUMENTS

| | | |
|---|---|---|
| JP | H01-089632 U1 | 6/1989 |
| JP | 2000512720 A | 9/2000 |
| JP | 2004116701 A | 4/2004 |
| JP | 200523993 A | 1/2005 |
| JP | 2007092990 A | 4/2007 |
| JP | 2011-241939 A | 12/2011 |

\* cited by examiner

US 9,797,495 B2

CLUTCH AND DIFFERENTIAL DEVICE WITH SAME

CROSS-REFERENCE TO RELATED APPLICATIONS

This application is a continuation Application of PCT International Application No. PCT/JP2014/053454 (filed Feb. 14, 2014), the entire contents of which are incorporated herein by reference.

TECHNICAL FIELD

The disclosure relates to a clutch for a rotary machine such as a power take-off unit and a differential device with the same.

BACKGROUND

An automobile employs various rotary machines such as a differential device and a power take-off unit. Some of these rotary machines often have clutches incorporated therein.

When a vehicle turns to either the right or the left for example, the right and left wheels must create considerable difference in rotational speed therebetween. While a differential device distributes torque from an engine or motor to right and left axles with allowing differential motion therebetween, it is possible that a clutch is used to limit the differential motion between these axles. A differential device in which a clutch is used to lock differential motion is referred to as "lock-up differential". Some other purposes may necessitate incorporation of clutches in rotary machines.

An actuator such as a hydraulic device or a solenoid is used in combination with the clutch. The actuator drives one of clutch members along an axis of the rotary machine, thereby realizing connection and disconnection of the clutch.

Japanese Patent Application Laid-open No. 2007-92990 discloses a related art.

SUMMARY

When the clutch gets connected, a major part of the torque which the differential device is to transmit acts on the clutch teeth. An axial force for retaining connection of the clutch also acts on the clutch teeth. In order to bear the stress originated from these forces and nevertheless produce sufficient durability, the clutch teeth can be formed to be circumferentially wide (the number of the clutch teeth is small).

Clutches incorporated in rotary devices in the past had to be operable only when the vehicles were parked, whereas there is, in recent years, a growing need for clutches operable even while running. To facilitate connection of clutch members in relative rotation, the clutch teeth can be formed to be circumferentially narrow (the number of the clutch teeth is great).

More specifically, durability and operability of the clutch are in a trade-off relationship and it is therefore difficult to improve both of them at a time. The device described below has been devised in light of this problem.

According to a first aspect, a clutch to be combined with a rotary machine rotating about an axis is comprised of a rotary member including a first face perpendicular to the axis, a first bottom receding in an axial direction from the first face, and plural first clutch teeth being arranged in a circumferential direction and respectively projecting from both the first face and the first bottom; and a clutch member movable in the axial direction relative to the rotary member, the clutch member including a second bottom, plural second clutch teeth being arranged in a circumferential direction and respectively projecting from the second bottom to be respectively engageable with the plural first clutch teeth, and an internal peripheral wall connecting internal ends of the plural second clutch teeth and projecting in the axial direction toward the rotary member.

According to a second aspect, a differential device rotating about an axis and distributing torque to a pair of shafts is comprised of a casing having one or more through-holes and receiving the torque to be rotatable about the axis; a differential gear set including an input gear coupled with the casing and first and second side gears meshing with the input gear and coupled with the shafts to distribute the torque to the shafts, the first side gear including a first face perpendicular to the axis, a first bottom receding in an axial direction from the first face, and plural first clutch teeth being arranged in a circumferential direction and respectively projecting from both the first face and the first bottom; and a clutch member movable in the axial direction relative to the first side gear, the clutch member including a second bottom, plural second clutch teeth being arranged in a circumferential direction and respectively projecting from the second bottom to be respectively engageable with the plural first clutch teeth, an internal peripheral wall connecting internal ends of the plural second clutch teeth and projecting in the axial direction toward the first side gear, and one or more projections respectively engaging with the through-holes.

DESCRIPTION OF EMBODIMENTS

Exemplary embodiments will be described hereinafter with reference to FIGS. 1 through 8.

While a lock-up differential device of a bevel gear type could exemplify these embodiments, the embodiments are not limited thereby. The embodiments will be readily converted to the other applications to rotary machines such as a free-running differential device or a power take-off unit. In addition, the following descriptions are related to an example in which the differential device is applied to axles of a vehicle but it may also be applied to the other shafts such as a propeller shaft. Further, as the distinction between the right and the left is only for descriptive purposes, the embodiments do not depend on the orientation. Still further, inside-out variants may be possible as to some constituents.

Figure 1:
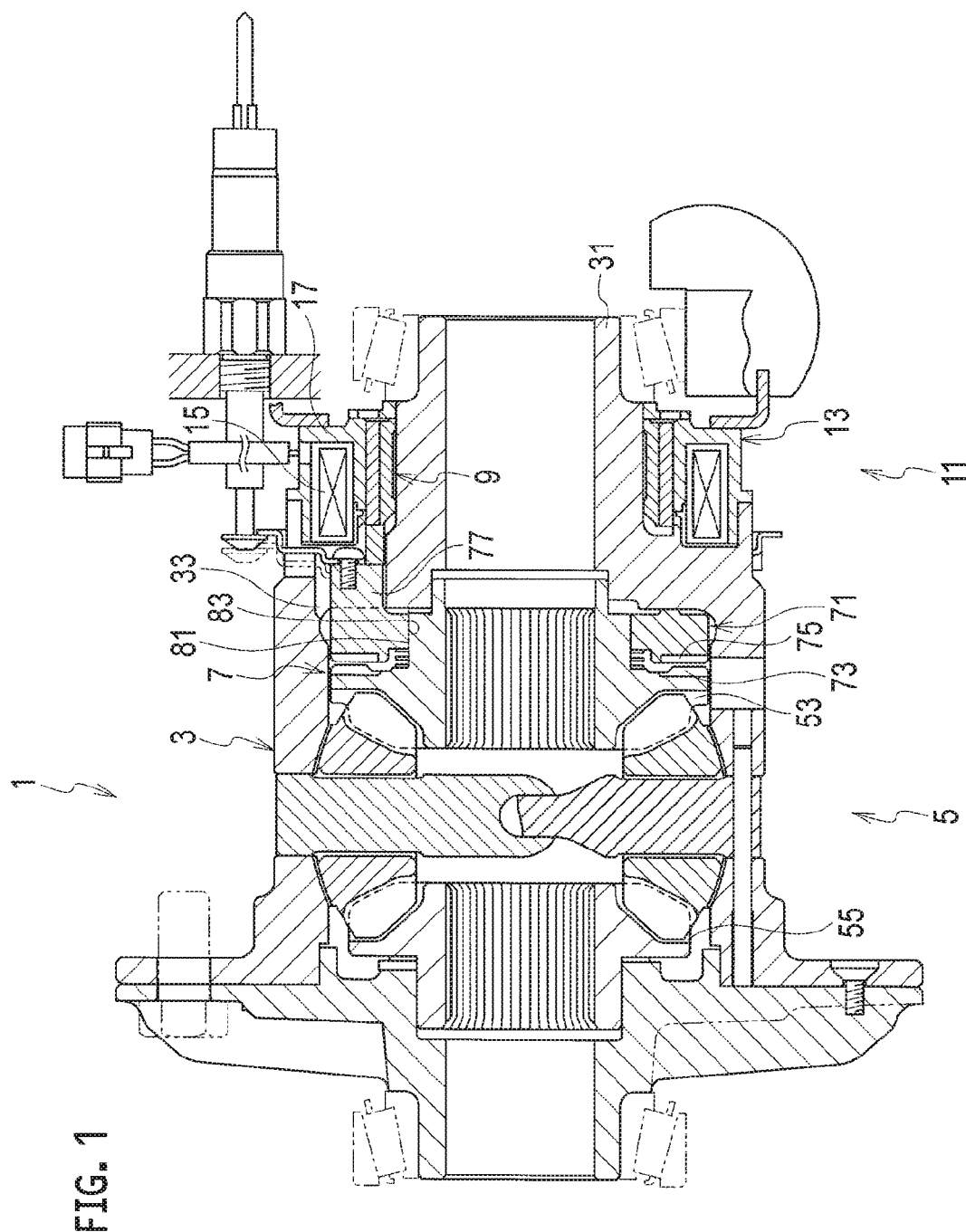
FIG. 1 is a sectional view of a differential device in which a clutch is incorporated in an example.

Referring to FIG. 1, a differential device 1 is comprised of a differential case 3 rotatable about an axis, a differential gear set 5 housed therein, a clutch 7, and a combination of a plunger 9 and an actuator 11 for driving the clutch 7.

The differential case 3 is constituted of a case main body and a cover body covering an end thereof, in which the differential gear set 5 and a clutch member 71 are housed. The case main body and the cover body respectively have boss portions 31 projecting axially outward, which are rotatably supported by a carrier with having bearings interposed therebetween, whereby the differential case 3 is rotatable about its axis. The differential case 3 generally receives torque from an engine and/or motor of the vehicle to rotate, and the differential gear set 5 and the clutch member 71 housed therein rotate along with the differential case 3.

The differential gear set 5 is, in a case of a bevel gear type, for example, constituted of a plurality of pinion gears 51, and a first side gear 53 and a second side gear 55 both meshing therewith. The pinion gears 51 are input gears receiving the torque from the differential case 3. The side gears 53, 55 are respectively coupled with the right axle and the left axle and differentially distribute the received torque to these axles.

Figure 2:
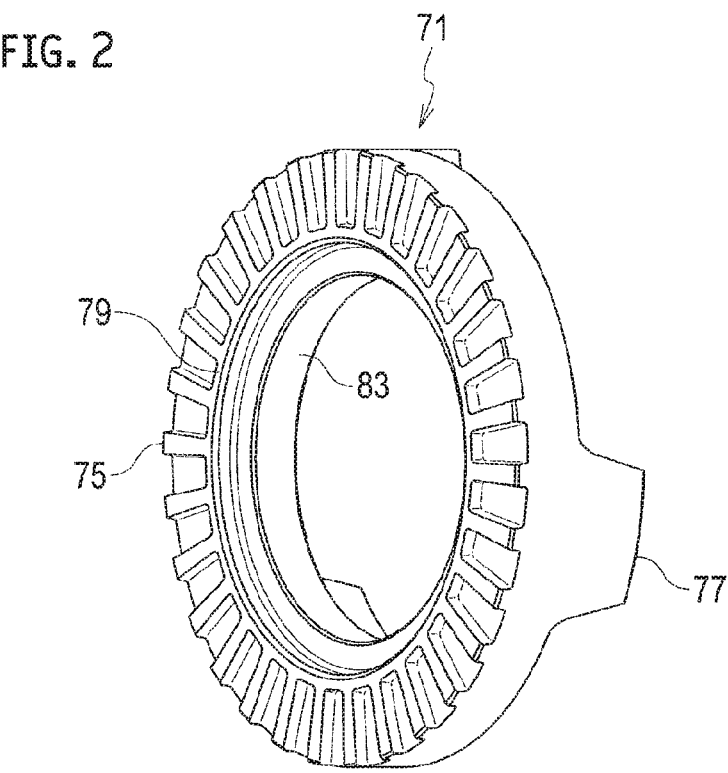
FIG. 2 is a perspective view of a clutch member, which mainly shows a side having clutch teeth.
Figure 3:
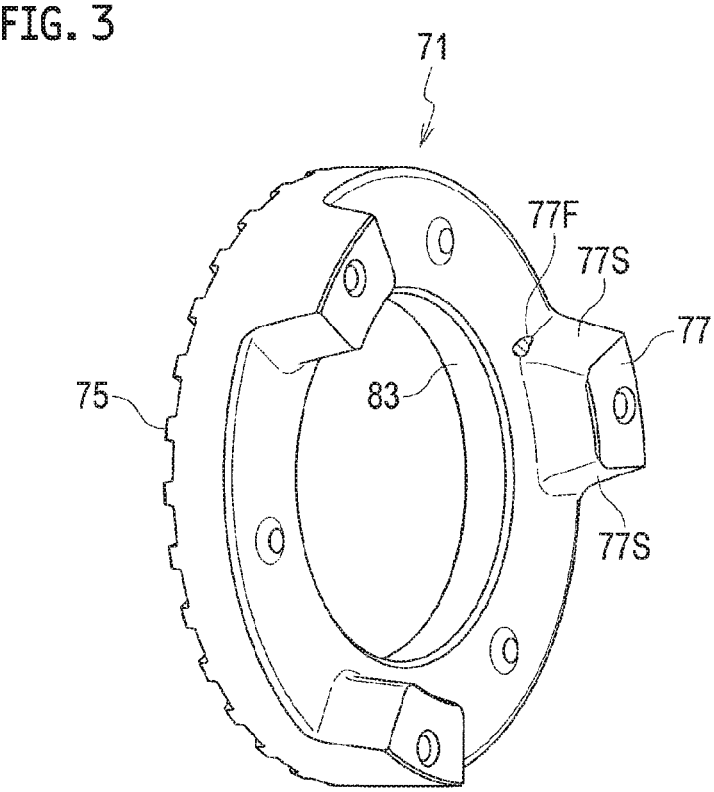
FIG. 3 is another perspective view of the clutch member, which mainly shows another side having cam projections.

Housed in the differential case 3 is the clutch member 71 opposed to the right side gear 53. Referring to FIGS. 2 and 3 in combination with FIG. 1, the clutch member 71 has a ring-like shape and an internal periphery 83 of this ring slidably fits on a boss portion 81 of the right side gear 53 for example, thereby being axially movable.

Figure 4:
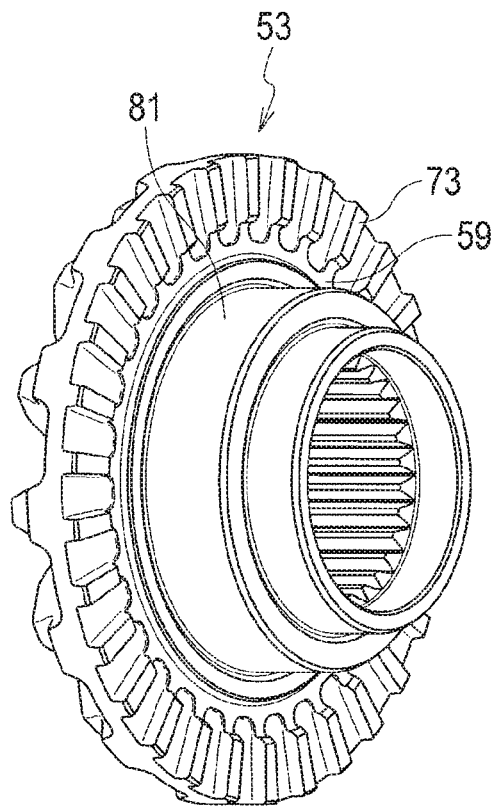
FIG. 4 is a perspective view of a side gear having clutch teeth to be meshed with the clutch member.

Further referring to FIG. 4, the right side gear 53 is comprised of a plurality of first clutch teeth 73 arranged in a circumferential direction of the gear 53 on a side opposed to the clutch member 71. Corresponding thereto, the clutch member 71 is comprised of a plurality of second clutch teeth 75 arranged in circumferential direction of the clutch member 71 on a side opposed to the right side gear 53. The clutch teeth 73, 75 are capable of meshing mutually and, more specifically, the combination of the right side gear 53 and the clutch member 71 forms the clutch 7. The clutch teeth 73, 75 will be described later in more detail.

Mainly referring to FIGS. 1 and 3, the clutch member 71 is comprised of a plurality of projections 77 axially projecting from a side opposite to the side of the second clutch teeth 75. The differential case 3 is comprised of through-holes 33 as corresponding thereto, with which the projections 77 engage, so that the clutch member 71 and the differential case 3 rotate together.

The projections 77 further pass through the through-holes 33 so as to have their tops exposed to the exterior. The plunger 9 is comprised of a plurality of claws as corresponding to the projections 77, which respectively contact the tops of the projections 77. When the actuator 11 drives the plunger 9 along the axis toward the clutch member 71, the claws press the projections 77 to make the clutch 7 connected. When the plunger 9 moves in its opposite direction, the clutch 7 gets disconnected. To promote disconnection, between the right side gear 53 and the clutch member 71, or at any other proper site, an elastic body such as a spring for biasing the clutch member 71 rightward may be interposed.

Mainly referring to FIG. 1, applicable to the actuator 11 is a hydraulic device, a pneumatic device, a combination of a motor and a gear, or a solenoid. The following description is related to an example where the solenoid 13 is used. The solenoid 13 is in general constituted of an electromagnetic coil 15 and a core 17 for conducting magnetic flux generated by the electromagnetic coil 15 and is symmetric about, and circular around, the axis. The solenoid 13 is coaxial with the differential case 3 and is so disposed as to adjoin the right wall of the case 3.

In order to place the solenoid in position, the wall portion of the differential case 3 may have a groove running in the circumferential direction and the core 17 may fit therein. The core 17 is further anti-rotated relative to the carrier (stationary member) housing the differential device 1. More specifically, the differential case 3 rotates relative to the anti-rotated solenoid 13.

The core 17 by itself may constitute a magnetic circuit surrounding the electromagnetic coil 15 but leaving a gap, or the magnetic circuit may further include the right wall of the differential case 3 as a part thereof. While the gap is radially inside of the electromagnetic coil 15 in the illustrated example, it may be at the outside.

The plunger 9 slidably fits on the solenoid 13 so as to face the solenoid 13 and also span the gap. The plunger 9, in addition, preferably slidably fits on and is supported by the boss portion 31 of the differential case 3. The plunger 9, at least a side thereof opposed to the gap, is formed of a magnetic material. The magnetic flux generated by the electromagnetic coil 15, mainly, does not leap over the gap but flows around the gap through the plunger 9, and this magnetic flux drives the plunger 9 along the axis.

Figure 5:
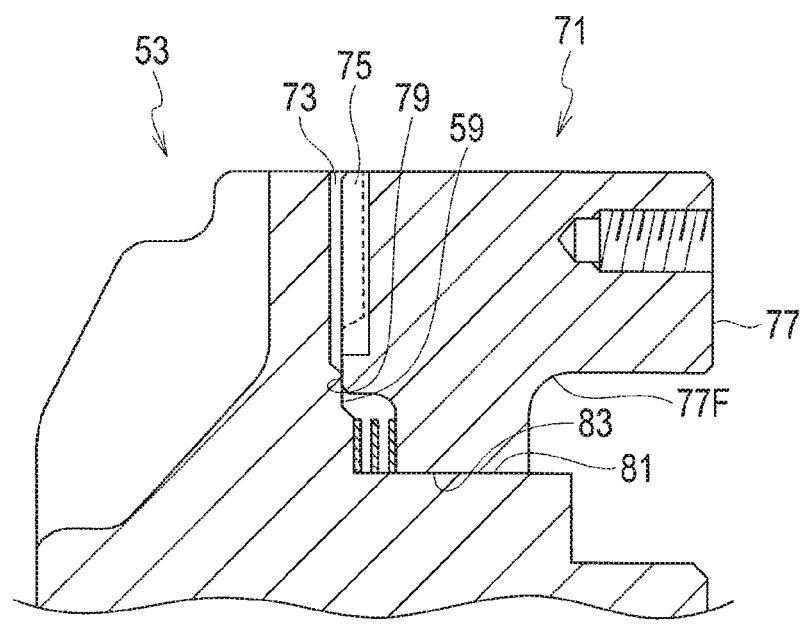
FIG. 5 is a sectional view of the side gear and the clutch member in a state where the clutch is connected.

As described above, as the plunger 9 abuts on the projections 77 of the clutch member 71, the actuator 11 can, when exciting the electromagnetic coil 15, drive the clutch member 71 to connect the clutch 7 as shown in FIG. 5. When the clutch 7 is connected, as the clutch member 71 inherently rotates along with the differential case 3, the right side gear 53 is also disabled from rotating relative to the differential case 3. Consequently differential motion between the side gears 53, 55 is limited. The differential device 1 then comes into a lock-up state.

Referring to FIG. 3 in combination with FIG. 1, in order to assist the axial force for pressing the clutch member 71 toward the right side gear 53, side faces 77S of the projections 77 may be respectively oblique relative to the circumferential direction. Side faces of the through-holes 33 may be also respectively oblique relative to the circumferential direction as corresponding to the side faces 77S of the projections 77. These side faces butting against each other function as a cam for converting part of the torque on the differential case 3 into an axial force, thereby pressing the clutch member 71 toward the right side gear 53. Therefore, even if the output power of the actuator 11 is relatively limited, sufficient force can be applied to the clutch 7 for retaining its connection.

More detailed descriptions about the clutch teeth 73, 75 will be given next.

Figure 6:
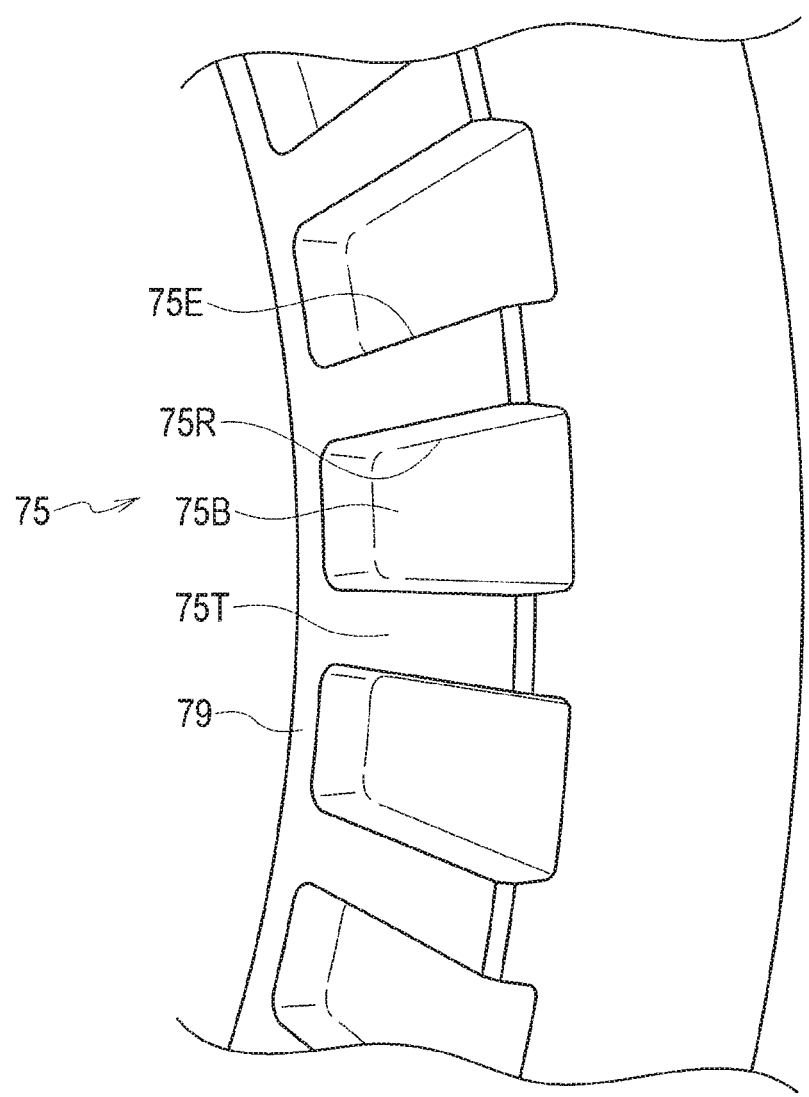
FIG. 6 is an enlarged perspective view of the clutch teeth of the clutch member.

Referring to FIG. 6 in combination with FIGS. 1, 2, in the clutch member 71, the face opposed to the right side gear 53 is perpendicular to the axis of the clutch member 71. A plurality of grooves, arranged at even intervals in the circumferential direction, is formed on this face and each of these grooves is so structured as to receive each clutch tooth 73 of the right side gear 53 independently. Formation of these grooves may be executed by grooving by forging or machining, or by any other suitable method.

Respective parts, each between adjacent grooves, axially projecting from bottoms (tooth roots) 75B of the respective grooves constitute the plurality of clutch teeth 75. The radially internal part compared with the clutch teeth 75 is left without forming grooves to constitute a single internal peripheral wall 79. The internal peripheral wall 79 connects radially internal ends of the plural clutch teeth 75 together, thereby reinforcing the clutch teeth 75. Although tooth top faces 75T of the clutch teeth 75 and the internal peripheral wall 79 may form a tiered structure, they may be instead formed to constitute a single flat face as shown in FIG. 6.

Each groove is, at its radially internal side, closed by the internal peripheral wall 79 but is opened radially outwardly. This promotes expulsion of lubricant flowing onto the tooth root 75B, thereby having the advantage to prevent the clutch 7 from sticking.

Figure 7:
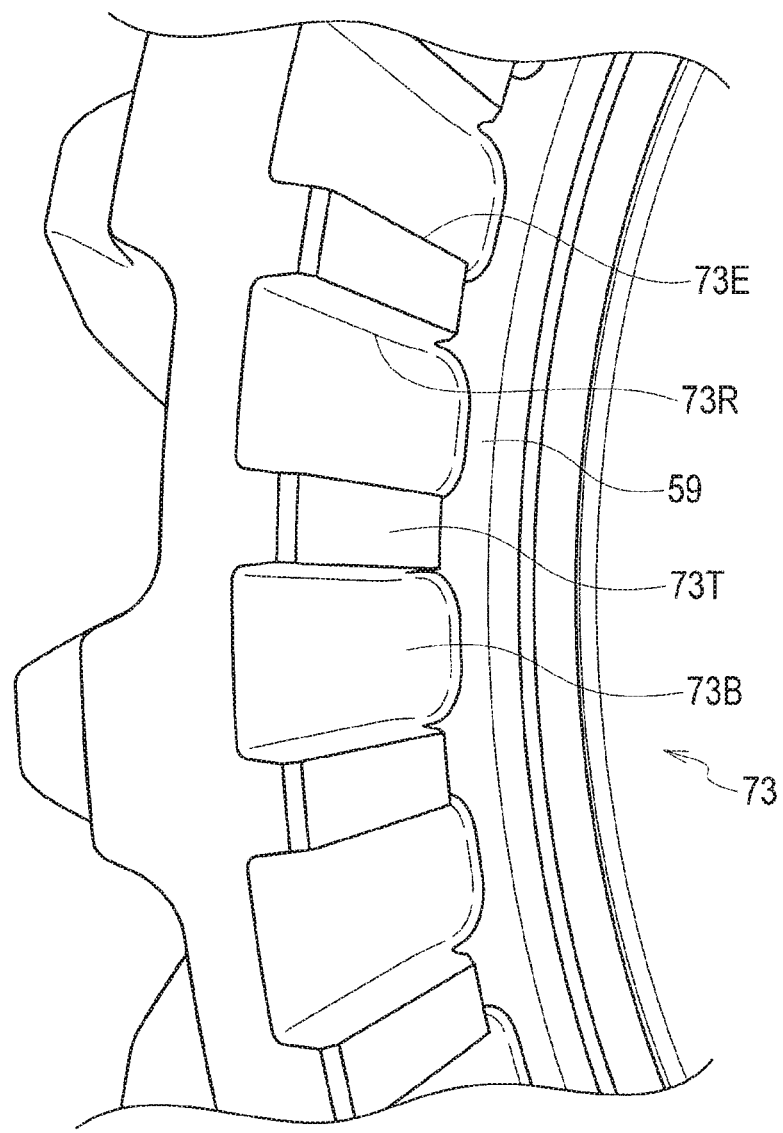
FIG. 7 is an enlarged perspective view of the clutch teeth of the side gear.
Figure 8:
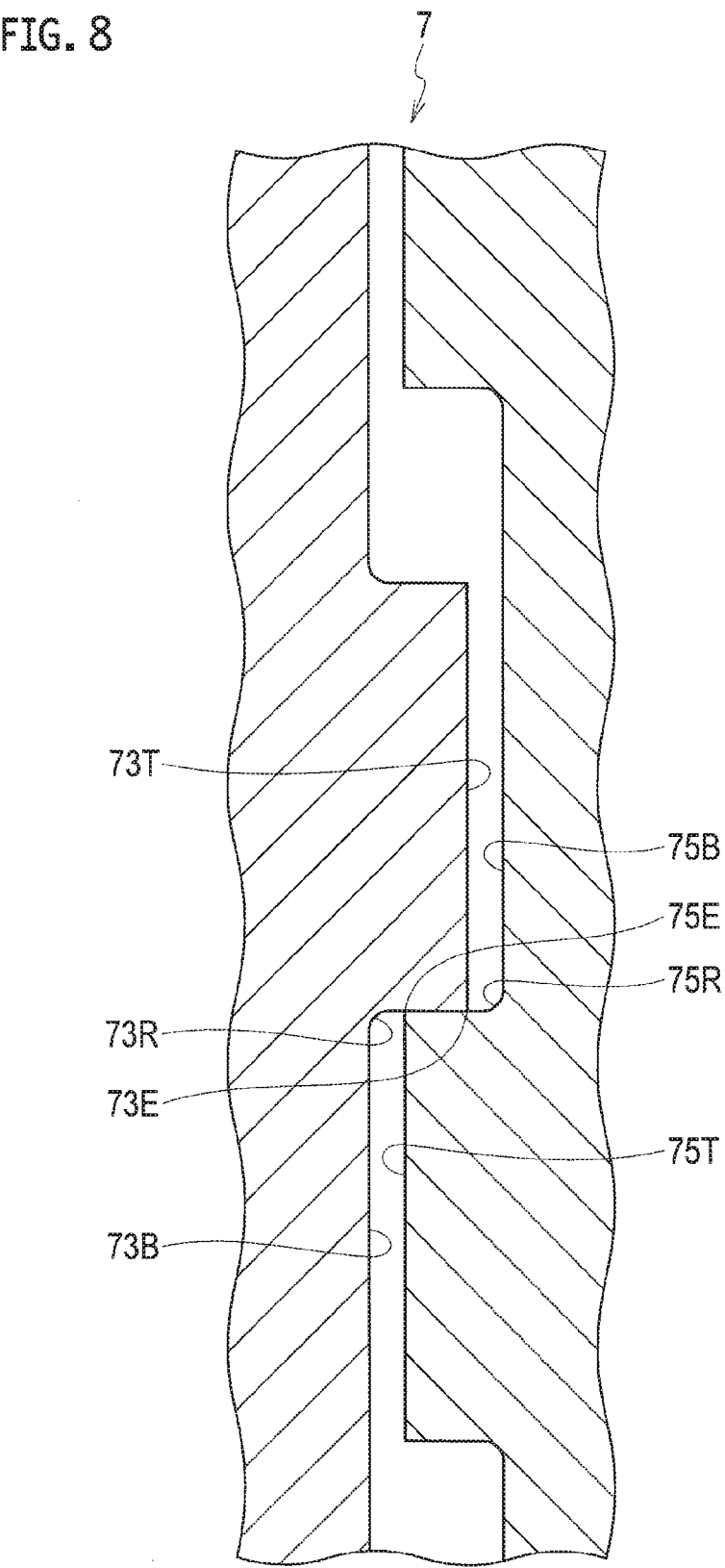
FIG. 8 is a sectional view along a circumferential direction of the side gear and the clutch member in a state where the clutch is connected.

Referring to FIG. 7 in combination with FIGS. 1, 4, in the right side gear 53, a face 59 opposed to the clutch member 71 is perpendicular to the axis of the right side gear 53. Formed thereon is a plurality of grooves, arranged at even intervals in the circumferential direction, axially receding from the face 59, each of which is structured so as to receive each clutch tooth 75 of the clutch member 71 independently. These grooves may be also formed by grooving by forging or machining, or by any other suitable method.

Respective parts, each between adjacent grooves, axially projecting from bottoms (tooth roots) 73B of the respective grooves, constitute the plurality of clutch teeth 73. Each tooth top face 73T projects over any of the bottom 73B and the face 59. Each groove is opened radially inwardly and outwardly and therefore promotes expulsion of lubricant, thereby having advantage to prevent the clutch 7 from sticking.

In the clutch teeth 73, 75, edges 73E, 75E on both borders of the tooth top faces 73T, 75T may be generally sharp and corners 73R, 75R between the tooth roots 73B, 75B and the clutch teeth 73, 75 may be properly rounded. They can depend on circumstances of machining.

As the clutch teeth 73, 75, the face 59, and the internal peripheral wall 79 are in a dimensional relationship as described above; when the clutch teeth 75 mesh with the clutch teeth 73, the internal peripheral wall 79 is put into contact with the face 59 as shown in FIG. 5 and thus the clutch member 71 cannot move further leftward. As is apparent in the illustration of FIG. 8 in combination with FIG. 5, the tooth top faces 73T are prevented from butting against the bottoms 75B and the tooth top faces 75T are also prevented from butting against the bottoms 73B.

Consequently, the axial force generated by the actuator 11, and the axial force that may be generated by the cam constituted of the combination of the through-holes and the projections 77, are borne mainly by contact between the internal peripheral wall 79 and the face 59 and do not act on the clutch teeth 73, 75. The clutch teeth 73, 75 only have to bear the force in the circumferential direction. There's no factor that creates complex stresses in the clutch teeth 73, 75. More specifically, this structure has advantage to lengthen the lifetime of the clutch teeth 73, 75 and to improve durability in severe circumstances. A contact area between the internal peripheral wall 79 and the face 59 is relatively small; because a net force of the aforementioned axial forces does not become excessive, the face in question is prevented from being damaged.

The present embodiment further prevents severe stress concentration around the edges 73E, 75E of the tooth top faces. More specifically, without the aforementioned dimensional relationship, the sharp edges 73E butt against the rounded corners 75R and also the sharp edges 75E butt against the rounded corners 73R. This results in severe stress concentration around the edges 73E, 75E, which further leads to shortening of lifetime of the clutch teeth 73, 75. In contrast according to the present embodiment, the edges 73E, 75E do not butt against the rounded corners 75R, 73R to prevent severe stress concentration. More specifically, this structure has the advantage to further lengthen the lifetime of the clutch teeth 73, 75 and to improve durability in severe circumstances.

The clutch teeth 73, 75 are elongated so as to reach the outermost periphery of the clutch member 17. Provided that torque being transmitted is constant, as an outer part contributes greater torque transmission, stress acting on the clutch teeth 73, 75 is made smaller. This reduces the need for widening the clutch teeth 73, 75. More specifically, as the present embodiment enables narrowing the clutch teeth 73, 75, connection of the clutch 7 is in turn made easier, thereby improving both durability and operability of the clutch.

When the clutch 7 is connected, relatively great torsional torque acts on the clutch member 71 so as to limit the differential motion of the differential gear set 5. This torsional torque generates relatively great stress concentration around leg portions of the projections 77 for example (see regions with a reference sign 77F in FIG. 3 for example). According to the present embodiment, however, the internal peripheral wall 79 is positioned just behind these stress concentrated regions 77F, so that a large sectional area bears this stress. The present embodiment thus makes the large sectional area bear the concentrated stress and also in this aspect contributes improvement in durability.

Clutch members are on the one hand among members somewhat suspected of breaking in lock-up differential devices but at the same time are difficult to detach once incorporated in the devices. In practical use, when a clutch member breaks, the whole of the differential device often needs to be replaced. Therefore lifetime or durability of the clutch member controls lifetime or durability of the whole of the differential device. The present embodiment lengthens a lifetime of the member in question and improves durability thereof, thereby contributing a longer lifetime and the durability of the whole of the differential device.

Although the above descriptions exemplify the lock-up differential device, other rotary machines such as power take-off units or axle disconnects could enjoy the same or similar effects.

Although certain embodiments have been described above, modifications and variations of the embodiments described above will occur to those skilled in the art, in light of the above teachings.

The invention claimed is:

1. A clutch combinable with a rotary machine rotating about an axis, comprising:
   a rotary member including a first face perpendicular to the axis, a first bottom receding in an axial direction from the first face, and a plurality of first clutch teeth arranged in a circumferential direction and respectively projecting from both the first face and the first bottom; and
   a clutch member movable in the axial direction relative to the rotary member, the clutch member including a second bottom, a plurality of second clutch teeth arranged in a circumferential direction and respectively projecting from the second bottom so as to be respectively engageable with the first clutch teeth, and an internal peripheral wall connecting internal ends of the second clutch teeth and projecting in the axial direction toward the rotary member;
   wherein each of the plural first clutch teeth comprises a first tooth top face opposed to the second bottom, each of the plural second clutch teeth comprises a second tooth top face opposed to the first bottom face, the internal peripheral wall is so dimensioned as to come in contact with the first face when the second clutch teeth engage with the first clutch teeth, whereby the internal peripheral wall prevents the first tooth top faces from coming in contact with the second bottom and prevents the second tooth top faces from coming in contact with the first bottom.

2. The clutch of claim 1, wherein a plurality of second grooves are respectively enclosed by the internal peripheral wall, and the second clutch teeth and the second bottom are opened radially outwardly.

3. A differential device rotatable about an axis and for distributing torque to a pair of shafts, comprising:
  a casing having one or more through-holes and arranged to receive the torque to be rotatable about the axis;
  a differential gear set including an input gear coupled with the casing and first and second side gears meshing with the input gear and coupled with the shafts to distribute the torque to the shafts, the first side gear including a first face perpendicular to the axis, a first bottom receding in an axial direction from the first face, and a plurality of first clutch teeth arranged in a circumferential direction and respectively projecting from both the first face and the first bottom; and
  a clutch member movable in the axial direction relative to the first side gear, the clutch member including a second bottom, a plurality of second clutch teeth arranged in a circumferential direction and respectively projecting from the second bottom to be respectively engageable with the first clutch teeth, an internal peripheral wall connecting internal ends of the second clutch teeth and projecting in the axial direction toward the first side gear, and one or more projections respectively engaging with the through-holes;
  wherein each of the plural first clutch teeth comprises a first tooth top face opposed to the second bottom, each of the plural second clutch teeth comprises a second tooth top face opposed to the first bottom face, the internal peripheral wall is so dimensioned as to come in contact with the first face when the second clutch teeth engage with the first clutch teeth, whereby the internal peripheral wall prevents the first tooth top faces from coming in contact with the second bottom and prevents the second tooth top faces from coming in contact with the first bottom.

4. The differential device of claim 3, wherein a plurality of second grooves are respectively enclosed by the internal peripheral wall, and the plural second clutch teeth and the second bottom are opened radially outwardly.

5. The differential device of claim 3, wherein each of the projections comprises a side face oblique to the circumferential direction and each of the through-holes comprises a side wall oblique to the circumferential direction corresponding to the projections so that contact between the side faces and the side walls converts a part of the torque into an axial force to press the clutch member toward the first side gear.

* * * * *